W. & G. H. SELLERS.
Burning Gaseous Fuel in Metallurgic and other Furnaces.
No. 148,250. Patented March 3, 1874.

3 Sheets--Sheet 2.
W. & G. H. SELLERS.
Burning Gaseous Fuel in Metallurgic and other Furnaces.
No. 148,250.  FIG. 4.  Patented March 3, 1874.
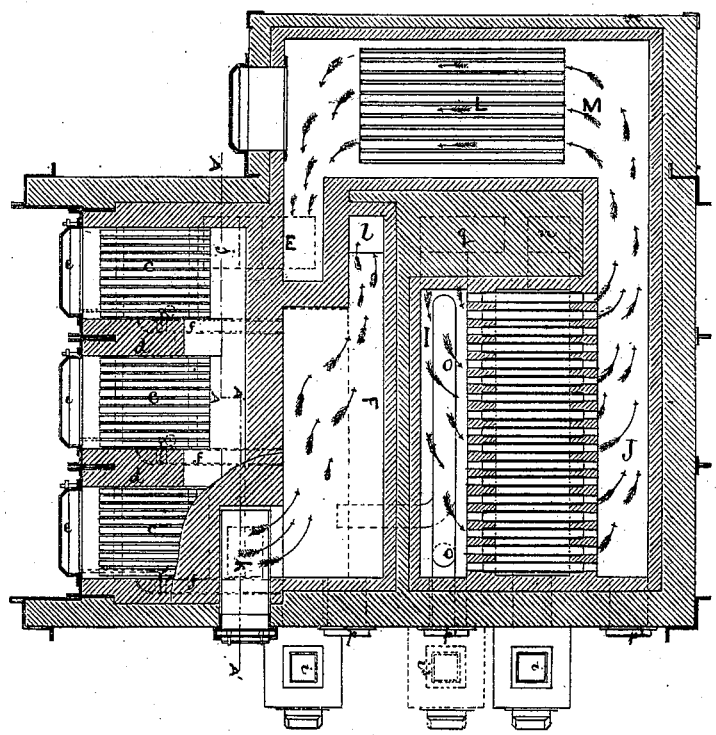
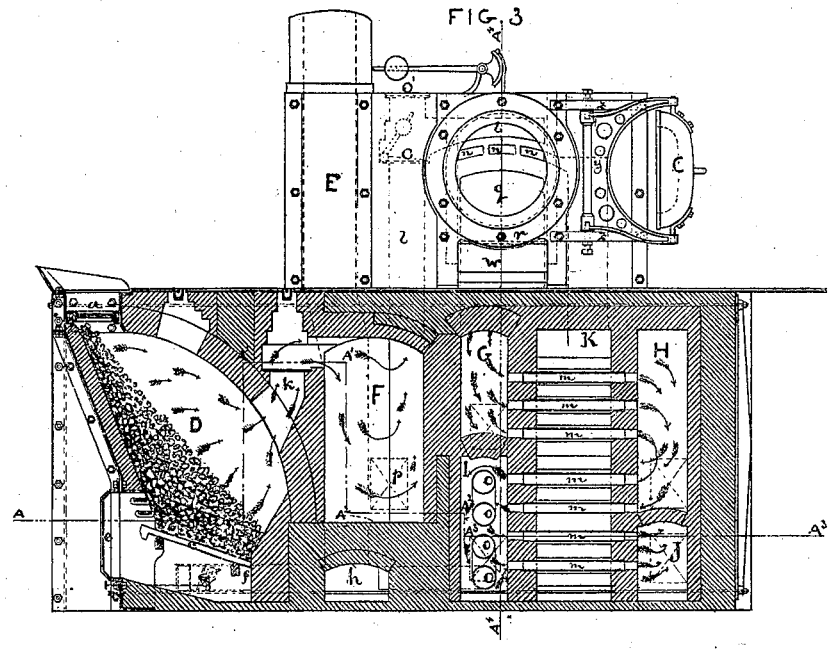
WITNESSES.  INVENTORS.

W. & G. H. SELLERS.
Burning Gaseous Fuel in Metallurgic and other Furnaces No. 148,250. Patented March 3, 1874.

UNITED STATES PATENT OFFICE.

WILLIAM SELLERS, OF PHILADELPHIA, PENNSYLVANIA, AND GEORGE H. SELLERS, OF WILMINGTON, DELAWARE.

IMPROVEMENT IN BURNING GASEOUS FUEL IN METALLURGIC AND OTHER FURNACES.

Specification forming part of Letters Patent No. 148,250, dated March 3, 1874; application filed September 3, 1873.

CASE A.

*To all whom it may concern:*

Be it known that we, WILLIAM SELLERS, of the city and county of Philadelphia and State of Pennsylvania, and GEORGE H. SELLERS, of Wilmington, in the county of New Castle and State of Delaware, have jointly invented certain new and useful Improvements in the Production, Consumption, and Application of Gaseous Fuel, and in the application of heat regenerated therefrom, with special adaptations to the process of puddling iron.

The following is a specification of our said improvements.

The object of our invention is to combine three conditions, which we deem essential to the most advantageous use of gaseous fuel, namely, first, a continuous production of the gas, subject to regulation as to quantity; second, a continuous consumption of the gas, subject to regulation as to quantity; and third, a constant regeneration of the waste heat resulting from the continuous but regulated consumption of the gaseous fuel; and, with these essentials, to apply the gaseous fuel intermittently while the heat generated by its continuous consumption shall be continuously utilized, as hereinafter exemplified in its adaptation to a rotary puddling-machine. It is further our object to economize the space required for the apparatus, to restrict its cost, to improve the construction and arrangement of various parts, and to enhance the facility of operation.

In the accompanying drawings, we have shown our invention in its adaptations to a rotary puddling-machine, and to a steam-boiler for operating the same.

Figure 1:
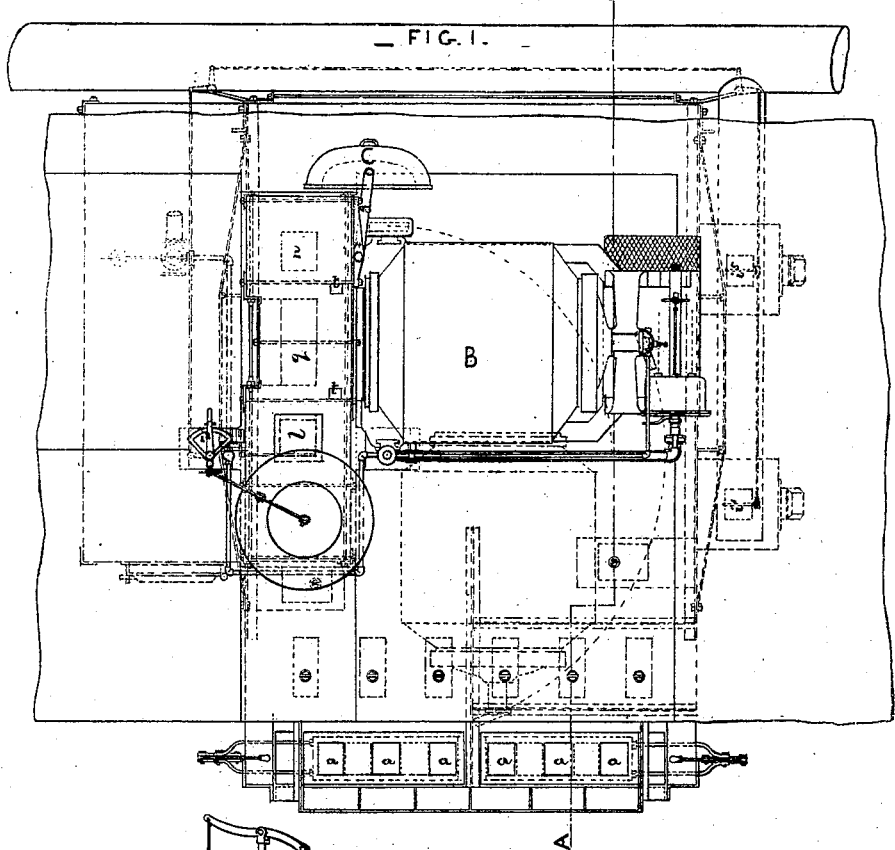
Figure 2:
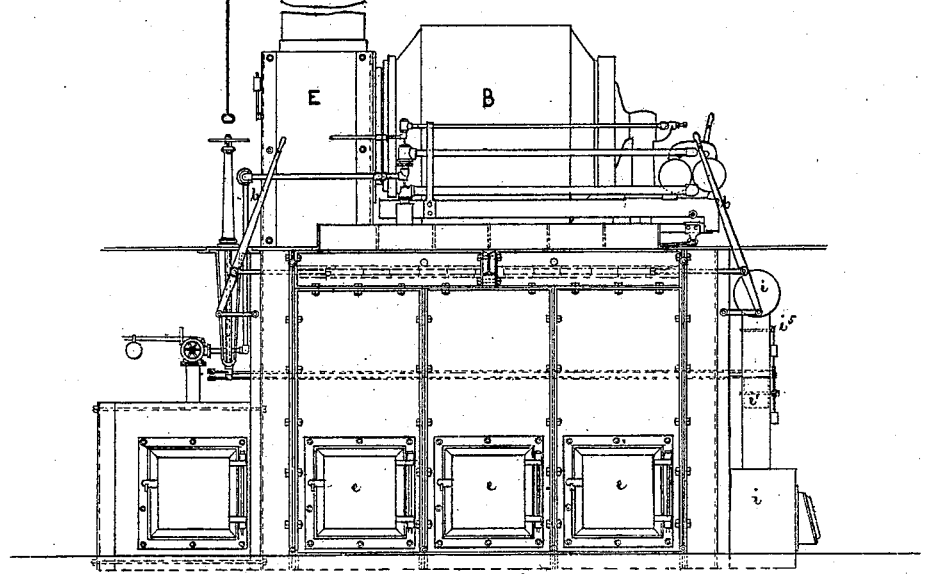
Figure 5:
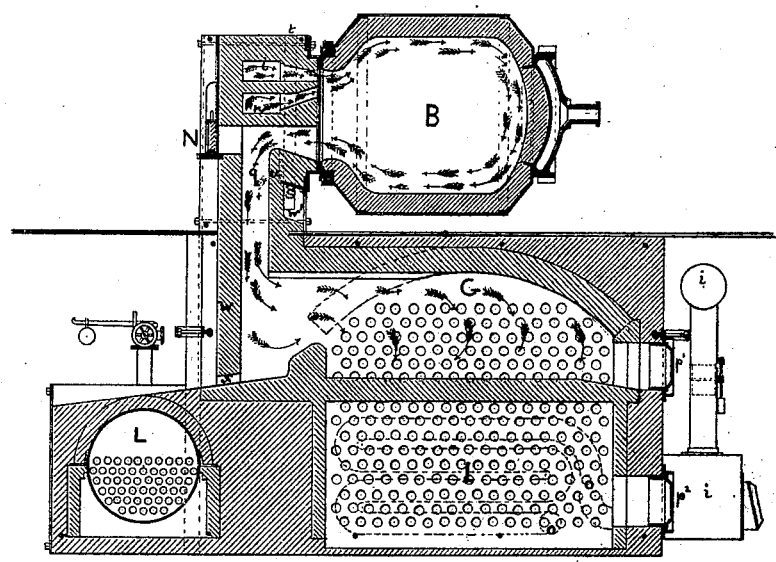
Figure 6:
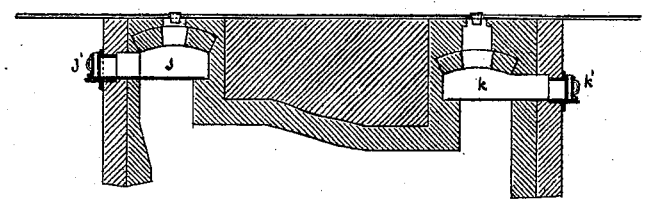

Figure 1 is a plan; Fig. 2, a side elevation; Fig. 3, a vertical section through the line A A of Fig. 1; Fig. 4, a horizontal section through the lines A A, $A^1 A^1$, $A^2 A^2$, and $A^3 A^3$, of Fig. 3; Fig. 5, a vertical section through the line $A^4 A^4$ of Fig. 3; Fig. 6, a vertical section of details on the line A A $A^1 A^1$ of Fig. 4.

The same letter of reference, wherever it occurs, indicates the same part.

The puddling-vessel B is constructed and operated substantially as described in Letters Patent granted to the aforesaid William Sellers, under date of March 5, 1872, No. 124,224; and as further described in a separate application filed by us of even date herewith. The details of its construction and operation form no part of the invention which is the subject of this patent, and it therefore need not be herein more particularly described than as a puddling-vessel open at one end only. We contemplate using in connection with such a puddling-vessel, or, when desirable, with vessels of other forms, the hood or recessed cover C, as will be presently described. The means by which we maintain a continuous production of the gas and regulate the quantity, as required, consists of a single producer, D, shown in Fig. 3, having an arched top, the upper end of which abuts against the casing of the two charging-valves $a\ a$. Each of these valves comprises three horizontal plates, having rectangular openings through them corresponding with each other. The upper and lower plates are fixed at such a distance apart that the middle plate can traverse freely between them, while it rests and slides upon the lower one. The openings through these plates are of such size and relation to each other that when the middle plate is in one position there will be a series of openings through the plates to the interior of the producer, and when the middle plate is in another position these openings will be closed by the intervention of the blanks or solid parts of the middle plate. The upper and stationary plate serves to partially relieve the middle or sliding plate from the pressure of coal upon it. The upper plate is below the level of the floor, over the arched top of the producer, and the casing which surrounds it is raised upon three sides above the level of this floor, thus forming a box to receive and retain the coal until it is required within the producer, to which it is admitted by moving the middle plate, as previously described. This movement is effected by means of levers $b\ b$, shown in Fig. 2. The coal falls upon inclined grates $c\ c\ c$, which we separate by division-walls $d\ d$, the top of these walls extending a short distance above the top of the grates, for a purpose hereinafter specified. The ash-pits are closed by doors $e\ e\ e\ e$, Figs. 2, 3, and 4, and a blast-pipe, $f f f$, in each ash-pit, supplies the air to support combustion. Each of these pipes has a valve, $g$, Fig. 3, which should be closed to prevent escape of air when the door $e$ is opened, and opened to admit air when the door $e$ is closed. These blast-pipes are connected with a blast-chamber, $h$, Fig. 3, to which air is supplied from the blast box and pipe $i\ i$, Figs. 2 and 5. It is in connection with the operation of this blast that we have divided the ash-pit by the walls $d\ d$, previously described, carrying them above the surface of the grate-bars sufficiently high to prevent the blast from diverging laterally at any point where it might otherwise issue into an adjoining ash-pit when the door is open. We are thus enabled to open any one of the pits, clean its grates, and remove its ashes, without affecting the operation of the blast in the other two divisions, which will maintain the continuous production of the gas. The quantity of gas produced is regulated by controlling the blast in the pipe $i$; which control is exercised by means of the valve $i^1$, Fig. 2, operated from the hand-lever $i^2$ through a vertical shaft, and a rod and bell-crank connection, the hand-lever $i^2$ being, for convenience, located near the door N, through which the interior of the furnace can be examined. In the arched top of the producer the ordinary spy-holes are provided, and in the back of this arched top are two openings, $j$ and $k$, Figs. 3, 4, and 6, each of which is provided with a slide damper or valve, shown in detail at Fig. 6. These valves are accessible through the doors $j^1$ and $k^1$, Fig. 6. The opening $j$ leads directly into the chimney E, and is for the purpose of providing an escape for the impure gases or smoke generated at first lighting the fires, and also for creating a draft through the producer until the fires are properly ignited. The valve in this opening is then closed and the top covered with sand so as effectually to prevent the escape of gas in that direction. The opening $k$ leads from the producer to one end of a dust-chamber, F, Figs. 3 and 4. The damper or valve in this opening is closed while the damper $j$ is open, and until the gas generated in the producer is of the proper quality for combustion. When the damper $j$ is closed the damper $k$ is opened, and remains open so long as the fires are in proper condition. The gas passes to the point of combustion from the producer through the dust-chamber F to and through the uptake $l$, Figs. 1, 3, 4, and 5. This dust-chamber being of large dimensions, the current through it will be so slow as to permit the deposit therein of any ashes carried over with the gas from the producer, and, being located between the producer and regenerator, the temperature of the traversing gas will be rather increased than diminished. For the purpose of cleaning, access to this chamber may be had through the door $p$, Figs. 3 and 4. To examine the interior of the puddling-vessel through the door N, provided for that purpose, it may be requisite, for the moment, to shut the gas off entirely. This is accomplished by means of the hinged valve O in the uptake $l$, Fig. 3. The handle to operate this valve projects through the back of the flue-casing near the door N, Fig. 5, and to clean the uptake, as well as to sand the top of the valve O, the opening and cover $O^1$, on the top of the gas-uptake, is provided. The valve O is sanded when it is desired to seal up the producer and prevent the formation of gas without putting out the fire. The means by which we maintain a continuous consumption of the gas, and regulate the quantity, consists in combining with the regulated production of gas, previously described, a continuous regulated supply of air to a continuous regenerative system of chambers and pipes comprising the side chambers G H I J, and a central chamber, K, across which latter chamber the pipes $m\ m\ m\ m$ extend and communicate with the side chambers. The chambers G H I J are provided with doors $p^1\ p^2$, Figs. 4 and 5, through which these chambers and the regenerator-tubes may be readily examined, and are accessible for cleaning when necessary. The air passes to the point of combustion over the pipes $m\ m$, and through the chamber K, to and through the uptake $n$, Figs. 1, 3, 4, and 5, taking up on its way the heat transmitted through the pipes $m\ m$ from the products of combustion as they pass on their way to the chimney, from the chamber G to the chamber H, from the chamber H to the chamber I, and from the chamber I to the chamber J. As the air required to produce combustion is not sufficient to take up all the available heat from the waste products of combustion, we utilize the remainder by conducting the waste products from the chamber J under and through the tubular boiler L, located in a chamber, M, Fig. 4, between the chamber J and the chimney E, the draft through which is regulated by a damper on the top of the chimney. The regulation of the air-supply to the regenerative system is effected by controlling the blast in the pipe $i$, which control is exercised by means of the valve $i^5$, Fig. 2, operated from a hand-lever placed under the hand-lever $i^2$, and connected with the valve by means of a hollow vertical shaft and a rod and bell-crank connection, as in the previously-described air regulation to the gas-producer. As in the use of some fuels, it may be desirable to employ a heated blast, we provide for use in such contingencies regenerative blast-pipes $o\ o$, Figs. 3, 4, and 5, within the chamber I, and communicating with the blast-chamber $h$. The pipes $o\ o$ receive their supply of air from the blast-box $i^3$, shown in dotted lines, Fig. 4, as a substitute for the blast-box $i$ connected with the chamber $h$, as previously described. We contemplate in such case to dispense with the doors $e\ e$ and grate-bars, as the coal should rest upon a hearth, and the blast be delivered through tuyeres supplied from the blast-chamber $h$, the cinder being fluxed and allowed to flow out as in blast-furnaces, and as is well understood.

From the foregoing it will be seen that we have brought the pure gas from the producer, through the chamber F, to the uptake $l$, and at the same time have brought the heated air, through the chamber K, to the uptake $n$, both the air and the gas being brought to these respective points under pressure and otherwise in the best condition for their admixture.

We have found it highly desirable to locate the point of combustion at, or as nearly as practicable at, the mouth of the vessel in which the flame is to be applied; and, with this view, we have arranged the gas and air flues $l$ and $n$ so that as they approach the place of combustion the gas-flue shall be over the air-flue, both opening in the face of a vertical wall, as shown in Fig. 5. Below these openings we locate the downtake-opening $q$, Figs. 1, 3, 4, and 5, in such relation to the flues $l$ and $n$ as to bring all three openings in the same vertical plane and within the compass of the ring $r$, Fig. 3. From this opening $q$ to the chamber G the traverse of the waste products is shown by the arrows in Fig. 5.

Having brought the continuous and regulated production of the gas to the point already described, and having also provided for the continuous and regulated consumption of the gas, and again having provided for the regeneration of the heat from the waste products, and its extended utilization, it will readily be perceived that, with a furnace in which the application of the gaseous fuel is constant, the regeneration will necessarily be, like the production and consumption, continuous; but, desiring to apply these conditions to the process of puddling iron in a rotary puddling-vessel, we encountered the problem presented by the necessarily continuous action of the apparatus and the necessarily intermitted application of the fuel to such a vessel during the constantly-recurring intervals when it must be charged, discharged, or fixed.

The means by which we reconcile our continuous system with this intermittent application enables us to keep the regenerator up to the temperature required for puddling; to hold in reserve, for consumption in the puddling-vessel, the maximum power of the gaseous fuel; to economize this reserve power while maintaining it; and to control, regulate, and direct it as may be desired; the instrumentalities, moreover, being so compactly arranged that all these ends are rendered attainable within a restricted space.

The gas and air flues, the downtake, and the chimney are formed of fire-brick, and are supported by cast-iron staves and through-bolts, as shown in Figs. 1, 2, 3, and 5, and two of these staves are united with cross-pieces, forming a frame, to which the ring $r$ is secured. (See Fig. 3.) The rotary puddling-machine B is shown in position for charging, discharging, or fixing by the dotted lines, Fig. 1, in which position the ring $r$, with the openings $l$, $n$, and $q$, are exposed, as seen in Fig. 3. To connect the gas and air flues with the downtake during the intervals when the puddler is removed, we provide a recessed cover, C, lined with fire-brick, which is, in effect, a supplemental furnace. Preferably, this cover C is supported and turns upon its axis within the crane $y$, which swings on centers supported upon bars $z\ z$, bolted to the supporting-staves around the flues previously described. Means of adjustment are provided at its points of support in order that it may fit with sufficient accuracy against the ring $r$. We now swing the cover C against the ring $r$, and the consumption and regeneration continue, and can be regulated the same as when the heat was being applied in the furnace. When the furnace is ready for use again, the cover C is swung away from the ring $r$, the furnace B is replaced, and the application of the heat in the puddling operation is renewed, the boiler L continuing, as during the interval, to absorb the waste heat.

While the means of supporting and moving the furnace and the cover, respectively, toward and from the ring $r$, may be varied without departing from this feature of our invention, yet the furnace and cover should each be susceptible of being moved toward and from the ring, one making way for the other, as already described, without any interference between them in either movement, or in any of their respective positions.

The top of the inside wall $u$ of the downtake next the puddling-vessel is carried up above the outlet from the puddling-vessel, and protected with a lining of puddling-fix, so that in case the charge, which swells in the preliminary stages of the puddling process, should overflow the edge of the puddling-vessel, the overflow will be prevented from descending the downtake; and, to attain still greater security against the entrance of such overflow into the regenerative-chamber the downtake is so located, with reference to the regenerative-chamber, that any overflow would pass the opening into the regenerative-chamber and fall to the bottom of the downtake, whence it could flow out or be removed through the cinder-tap $x$ provided for this purpose in the outer wall $w$ of the downtake.

Although the provision just described, if properly made and maintained in good condition, will effectually prevent an overflow of cinder into the throat of the downtake, yet in practical operation the condition of the wall $u$ may be neglected, the cinder may cut its way through it to the throat of the downtake, and necessitate the rebuilding of the wall $u$. To guard against this contingency we leave an opening, $w'$, in the brick-work under the ring $r$, and the mouth of the downtake extending to the back of the wall $u$. The top of this opening is covered by an iron plate, $s$, its front edge resting on the iron casting which supports the ring $r$, and its back edge upon the top of the wall $u$, this plate forming a bottom upon which the puddling-fix in the throat of the downtake can be built up. At either end of this plate we provide the flues $t\ t$, communicating with the opening $w'$ and leading out to the top of the casing inclosing the air, gas, and downtake flues. (See Figs. 1, 3, and 5.) By this arrangement a circulation of air will be maintained against the under side of the plate $s$, which will keep it sufficiently cool to chill any cinder that may find its way through the lining of the mouth of the downtake previously described, and effectually stop its further progress.

Having thus described the nature and objects of our invention, what we claim as new, and desire to secure by Letters Patent, is—

1. A gas-producer having independent ash-pits, substantially as and for the purpose specified.

2. The combination, with a gas-producer, of separated ash-pits and blast-pipes, substantially as and for the purpose specified.

3. The combination, with a gas-producer having separated ash-pits and blast-pipes, of the valve $g$, substantially as and for the purpose described.

4. The combination of a gas-producer having separated ash-pits and blast-pipes, substantially as described, with a continuous heat-regenerative system through which the air to support the combustion of the gas is supplied under pressure, substantially as and for the purpose specified.

5. The combination of a furnace and a cover or supplemental furnace, one taking the place of the other, substantially as and for the purposes herein described.

6. The combination, substantially as hereinbefore set forth, of a gas-producer, a furnace, a cover or supplemental furnace, and a heat-regenerator.

7. The combination, substantially as hereinbefore set forth, of a gas-producer, a furnace in which the gas is intermittently applied, and a cover or supplemental furnace, in which it is intermittently consumed.

8. The combination of the producer, the furnace, (or the cover,) the regenerator, and the boiler.

9. The combination, with the producer and the regenerator, of the dust-chamber located between them, substantially as and for the purposes described.

10. The combination, with the producer, the regenerator, and the dust-chamber located between them, of the gas-uptake, substantially as described.

11. The combination, with the cover C, of two parallel axes, one within it and the other beyond it, substantially as and for the purposes described.

12. The combination, with a gas-producer and a heat-regenerator, of a chimney common to the incombustible gases from the producer and the waste products of combustion from the regenerator.

13. The combination, with a gas-producer and a chimney, of the valve or damper $j$, substantially as described.

14. The combination, with the gas-producer, the chimney, and the valve or damper $j$, of the valve $k$, substantially as and for the purposes described.

15. The iron bottom plate $s$, under the mouth of the downtake-flue, substantially as and for purposes described.

16. The combination, with the downtake, of the opening $w'$ and flues $t\ t$, substantially as and for the purposes described.

17. The combination, with the regenerative-chamber, of the downtake, located as described, to protect the chamber from an overflow of cinder, as set forth.

18. The combination, with the regenerative-chamber and the downtake $q$, of the cinder-tap $x$, substantially as and for the purposes set forth.

19. The combination, with the gas-producer, of the charging box and valve, constructed and operating substantially as described.

20. The combination, substantially as hereinbefore set forth, of a gas-producer, a combustion-chamber, (or a furnace,) a regenerative apparatus through which the air is supplied which supports the combustion in the furnace, and a regenerative apparatus through which the air is supplied which supports the combustion in the gas-producer.

WM. SELLERS.
GEO. H. SELLERS.

Witnesses:
SAMUEL L. TAYLOR,
WM. E. MORGAN.